United States Patent
Hudman

(10) Patent No.: US 11,314,323 B2
(45) Date of Patent: *Apr. 26, 2022

(54) POSITION TRACKING SYSTEM FOR HEAD-MOUNTED DISPLAYS THAT INCLUDES SENSOR INTEGRATED CIRCUITS

(71) Applicant: Valve Corporation, Bellevue, WA (US)

(72) Inventor: Joshua Mark Hudman, Issaquah, WA (US)

(73) Assignee: Valve Corporation, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/156,295

(22) Filed: Jan. 22, 2021

(65) Prior Publication Data

US 2021/0149481 A1     May 20, 2021

Related U.S. Application Data

(63) Continuation of application No. 16/250,821, filed on Jan. 17, 2019, now Pat. No. 10,921,881.

(Continued)

(51) Int. Cl.
    *G06F 3/01*       (2006.01)
    *G06T 7/246*     (2017.01)
    (Continued)

(52) U.S. Cl.
    CPC ........... *G06F 3/012* (2013.01); *G02B 27/017* (2013.01); *G06F 3/0346* (2013.01); *G06T 7/246* (2017.01);
    (Continued)

(58) Field of Classification Search
    CPC ...................................................... G06F 3/012
    See application file for complete search history.

(56) References Cited

U.S. PATENT DOCUMENTS 5,856,844 A    1/1999    Batterman et al.
8,203,605 B1    6/2012    Starner
                     (Continued)

FOREIGN PATENT DOCUMENTS

CN         104903775 A      9/2015
WO       2016/046514 A1    3/2016
                 (Continued)

OTHER PUBLICATIONS

European Search Report, dated May 7, 2021, for European Patent Application No. PCT/US2019/013971. (9 pages).

(Continued)

*Primary Examiner* — Roy P Rabindranath
(74) *Attorney, Agent, or Firm* — Seed Intellectual Property Law Group LLP

(57) ABSTRACT

Systems and methods for tracking the position of a head-mounted display (HMD). The HMD may include a support structure that carries a forward facing camera and a plurality of optical flow sensor integrated circuits (ICs). The forward camera captures image sensor data in a forward camera field of view (FOV) at a first frame rate, and each of the plurality of sensor ICs captures image sensor data in a respective plurality of sensor IC FOVs at a second frame rate. The sensor IC FOVs may collectively cover at least a substantial portion of the forward camera FOV. A processor may receive the image sensor data from the camera and the plurality of sensor ICs. The processor may process the received image sensor data and/or other sensor data (e.g., IMU data) to track a position of the head-mounted display based on the processing of the received sensor data.

18 Claims, 5 Drawing Sheets

Related U.S. Application Data

(60) Provisional application No. 62/618,928, filed on Jan. 18, 2018.

(51) Int. Cl.
*G09G 5/00* (2006.01)
*G02B 27/01* (2006.01)
*G06F 3/0346* (2013.01)

(52) U.S. Cl.
CPC ..... *G09G 5/003* (2013.01); *G02B 2027/0138* (2013.01); *G02B 2027/0187* (2013.01); *G06T 2207/10016* (2013.01)

(56) References Cited

U.S. PATENT DOCUMENTS

| | | | |
|---|---|---|---|
| 8,982,471 | B1 | 3/2015 | Starner et al. |
| 9,041,840 | B2 | 5/2015 | Borthakur et al. |
| 9,147,290 | B2 | 9/2015 | Kim |
| 9,495,783 | B1 | 11/2016 | Samarasekera et al. |
| 9,529,426 | B2 | 12/2016 | Liu et al. |
| 9,541,740 | B2 | 1/2017 | Georgiev |
| 2012/0287284 | A1 | 11/2012 | Jacobsen et al. |
| 2013/0187848 | A1 | 7/2013 | Abe |
| 2013/0201291 | A1 | 8/2013 | Liu et al. |
| 2014/0198017 | A1 | 7/2014 | Lamb et al. |
| 2014/0267667 | A1 | 9/2014 | Ellsworth |
| 2015/0309316 | A1* | 10/2015 | Osterhout ............... G06F 3/012 345/8 |
| 2015/0356737 | A1 | 12/2015 | Ellsworth et al. |
| 2016/0035139 | A1 | 2/2016 | Fuchs et al. |
| 2016/0124502 | A1 | 5/2016 | Sawyer et al. |
| 2016/0131761 | A1 | 5/2016 | Yates et al. |
| 2016/0259977 | A1 | 9/2016 | Asbun et al. |
| 2017/0249019 | A1 | 8/2017 | Sawyer et al. |
| 2018/0007339 | A1 | 1/2018 | Castleman |
| 2018/0108179 | A1 | 4/2018 | Tomlin et al. |
| 2019/0204599 | A1 | 7/2019 | Abbott |

FOREIGN PATENT DOCUMENTS

| | | |
|---|---|---|
| WO | 2016/046514 A8 | 3/2016 |
| WO | 2017/139871 A1 | 8/2017 |

OTHER PUBLICATIONS

Adimec, Excellence in Imaging "Resolution Versus Field of View"; Retrieved from: https://www/adimec.com/resolution-versus-field-of-view/ on Feb. 27, 2020, 6 pages.

International Search Report, dated Apr. 15, 2019, for International Application No. PCT/US2019/013971, 11 pages.

* cited by examiner

POSITION TRACKING SYSTEM FOR HEAD-MOUNTED DISPLAYS THAT INCLUDES SENSOR INTEGRATED CIRCUITS

BACKGROUND

Technical Field

The present disclosure generally relates to position tracking for head-mounted displays.

Description of the Related Art

One current generation of virtual reality ("VR") or augmented reality ("AR") experiences is created using head-mounted displays ("HMDs"), which can be tethered to a stationary computer (such as a personal computer ("PC"), laptop, or game console), combined and/or integrated with a smart phone and/or its associated display, or self-contained. Generally, HMDs are display devices, worn on the head of a user, which have a small display device in front of one (monocular HMD) or each eye (binocular HMD). The display units are typically miniaturized and may include CRT, LCD, Liquid crystal on silicon (LCos), or OLED technologies, for example. A binocular HMD has the potential to display a different image to each eye. This capability is used to display stereoscopic images.

Demand for displays with heightened performance has increased with the development of smart phones, high-definition televisions, as well as other electronic devices. The growing popularity of virtual reality and augmented reality systems, particularly those using HMDs, has further increased such demand. Virtual reality systems typically envelop a wearer's eyes completely and substitute a "virtual" reality for the actual or physical view (or actual reality) in front of the wearer, while augmented reality systems typically provide a semi-transparent or transparent overlay of one or more screens in front of a wearer's eyes such that actual view is augmented with additional information, and mediated reality systems may similarly present information to a viewer that combines real-world elements with virtual elements. In many virtual reality and augmented reality systems, the movement of a wearer of such a head-mounted display may be tracked in various manners, such as via sensors in the head-mounted display and/or external to it, in order to enable the images being shown to reflect user movements.

Position tracking allows an HMD to estimate its position relative to the environment around it. Position tracking may utilize a combination of hardware and software to achieve the detection of the absolute position of an HMD. Position tracking is an important technology for AR or VR systems, making it possible to track movement of HMDs (and/or controllers or other peripherals) with six degrees of freedom (6DOF).

Position tracking technology may be used to change the viewpoint of the user to reflect different actions like jumping or crouching, and may allow for an accurate representation of the user's hands and other objects in the virtual environment. Position tracking may also increase the connection between the physical and virtual environment by, for example, using hand position to move virtual objects by touch. Position tracking improves the 3D perception of the virtual environment for the user because of parallax, which helps with the perception of distance. Also, the positional tracking may help minimize reduce motion sickness caused by a disconnect between the inputs of what is being seen with the eyes and what is being felt by the user's ear vestibular system.

There are different methods of positional tracking. Such methods may include acoustic tracking, inertial tracking, magnetic tracking, optical tracking, combinations thereof, etc.

BRIEF SUMMARY

A head-mounted display may be summarized as including a support structure wearable on the head of a user; a camera carried by the support structure, in operation the camera captures image sensor data in a camera field of view at a first frame rate; a plurality of optical flow sensor integrated circuits (ICs) carried by the support structure, in operation each of the plurality of optical flow sensor ICs captures image sensor data in a respective plurality of sensor IC fields of view at a second frame rate, the sensor IC fields of view narrower than the camera field of view, and the second frame rate greater than the first frame rate; at least one nontransitory processor-readable storage medium that stores at least one of processor-executable instructions or data; and at least one processor operatively coupled to the camera, the plurality of optical flow sensor ICs, and the at least one nontransitory processor-readable storage medium, in operation, the at least one processor: receives the image sensor data from the camera and the plurality of optical flow sensor ICs; processes the received image sensor data; and tracks a position of the head-mounted display based at least in part on the processing of the received image sensor data. The at least one processor may fuse the image sensor data from the camera and the plurality of optical flow sensor ICs to track the position of the head-mounted display.

The head-mounted display may further include an inertial measurement unit (IMU) sensor operatively coupled to the at least one processor, wherein, in operation the at least one processor: receives IMU sensor data from the IMU sensor; processes the IMU sensor data and the image sensor data received from the camera and the plurality of optical flow sensor ICs; and tracks the position of the head-mounted display based at least in part on the processing of the received IMU sensor data and the received image sensor data. Each of the plurality of optical flow sensor ICs may include a single die having image sensing circuitry and image processing circuitry thereon. The first frame rate may be less than or equal to 100 frames per second, and the second frame rate may be greater than or equal to 1000 frames per second. The at least one processor may process the received image sensor data to detect one or more features present in an environment in which the head-mounted display operates. Each of the sensor IC fields of view may overlap with a portion of the camera field of view. The at least one processor may register the sensor IC fields of view with the camera field of view. The camera field of view may be greater than 100 degrees.

The head-mounted display may further include first and second display subsystems which each provide a display for one eye of a user, wherein, in operation, the at least one processor selectively presents images obtained from the camera via the first and second display subsystems.

A method of operating a head-mounted display, the head-mounted display including a support structure wearable on the head of a user, a camera carried by the support structure and a plurality of optical flow sensor integrated circuits (ICs) carried by the support structure, may be summarized as including capturing, via the camera, image sensor data in a camera field of view at a first frame rate; capturing, via the plurality of optical flow sensor ICs, image sensor data in a respective plurality of sensor IC fields of view at a second frame rate, the sensor IC fields of view narrower than the camera field of view, and the second frame rate greater than the first frame rate; receiving, by at least one processor, the image sensor data from the camera and the plurality of optical flow sensor ICs; processing, by the at least one processor, the received image sensor data; and tracking, by the at least one processor, a position of the head-mounted display based at least in part on the processing of the received image sensor data. Processing the received image sensor data may include fusing the image sensor data from the camera and the plurality of optical flow sensor ICs to track the position of the head-mounted display.

The head-mounted display may include an inertial measurement unit (IMU) sensor operatively coupled to the at least one processor, and may further include receiving, by the at least one processor, IMU sensor data from the IMU sensor; processing, by the at least one processor, the IMU sensor data and the image sensor data received from the camera and the plurality of optical flow sensor ICs; and tracking, by the at least one processor, the position of the head-mounted display based at least in part on the processing of the received IMU sensor data and the received image sensor data.

Capturing image sensor data via the plurality of optical flow sensor ICs may include capturing image sensor data via a plurality of optical flow sensor ICs that each include a single die having image sensing circuitry and image processing circuitry thereon. Capturing image sensor data in a camera field of view at a first frame rate may include capturing image sensor data in a camera field of view at a first frame rate that is less than or equal to 100 frames per second, and capturing image sensor data in the sensor IC fields of view at a second frame rate may include capturing image sensor data in the sensor IC fields of view at a second frame rate that is greater than or equal to 1000 frames per second. Processing the received image sensor data may include processing the received image sensor data to detect one or more features present in an environment in which the head-mounted display operates. Each of the sensor IC fields of view may overlap with a portion of the camera field of view. Processing the received image sensor data may include registering the sensor IC fields of view with the camera field of view. The camera field of view may be greater than 100 degrees.

The head-mounted display may further include first and second display subsystems which each provide a display for one eye of a user, and the method may further include selectively presenting images obtained from the camera via the first and second display subsystems.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1:
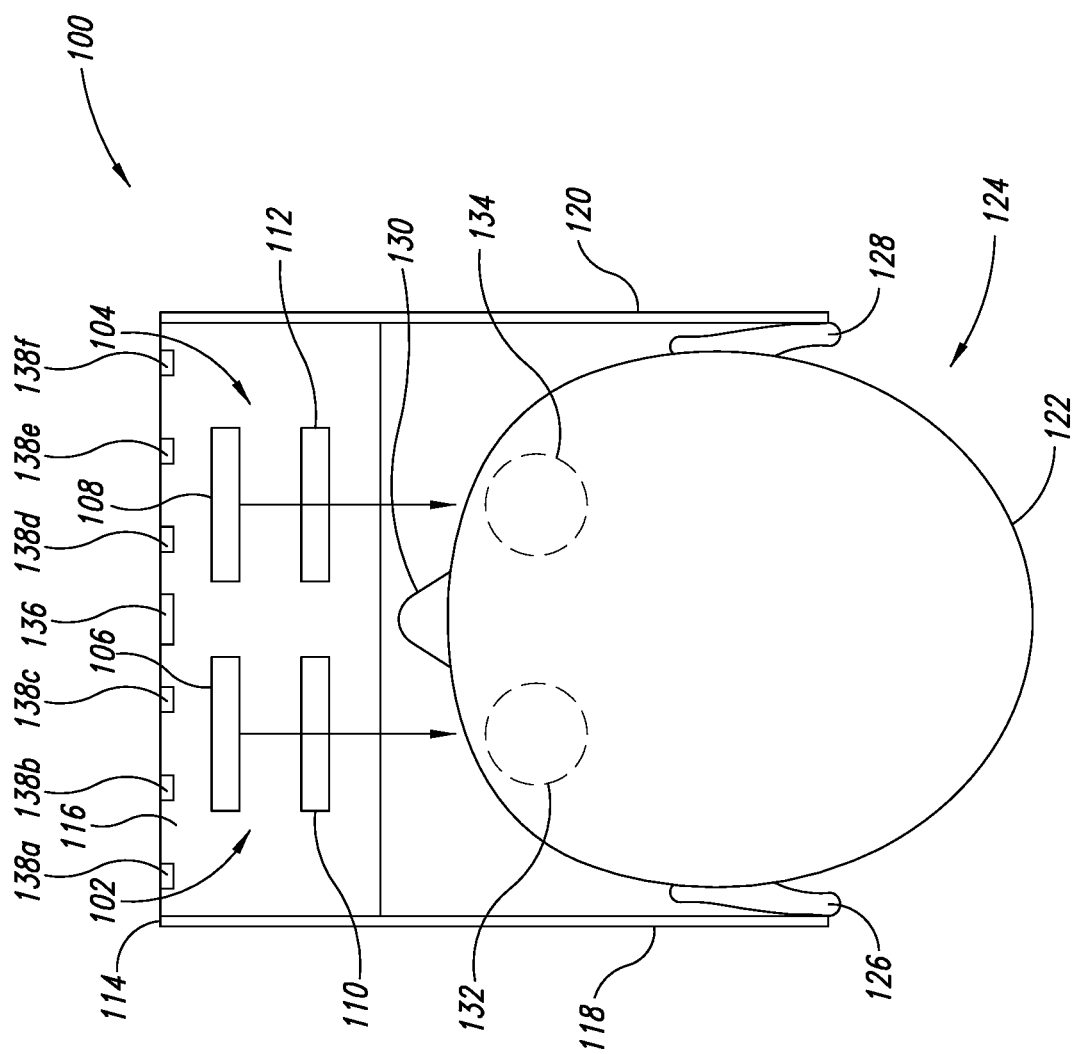
FIG. 1 illustrates a top plan view of a head-mounted display system which includes binocular display subsystems, a forward camera, and a plurality of sensor integrated circuits, according to an example embodiment of the present disclosure.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

One or more implementations of the present disclosure are directed to systems and methods for accurately tracking the position of a head-mounted display (HMD) during use by a wearer of the HMD. In at least some implementations, the HMD includes a support structure that carries a forward facing camera ("forward camera" or "front camera") and a plurality of optical flow sensor integrated circuits (ICs), or "sensor ICs." The forward camera captures image sensor data in a forward camera field of view at a first frame rate (e.g., 30 Hz, 90 Hz). Each of the plurality of sensor ICs captures image sensor data in a respective plurality of sensor IC fields of view at a second frame rate (e.g., 1000 Hz, 2000 Hz). In at least some implementations, the sensor IC fields of view may be narrower than the forward camera field of view. For example, the forward camera may have a relatively wide forward camera field of view of 90°, 120°, or 150°, and each of the sensor ICs may have relatively narrow sensor IC fields of view that are 15°, 30°, 45°, etc. In at least some implementations, the sensor IC fields of view may collectively cover at least a substantial portion the forward camera field of view, with each of the sensor IC fields of view overlapping with different portions of the forward camera field of view.

In operation, at least one processor operatively coupled to the forward camera and the plurality of sensor ICs may receive the image sensor data from the camera and the plurality of optical flow sensor ICs. The at least one processor may process the received image sensor data to track a position of the head-mounted display based at least in part on the processing of the received image sensor data. For example, the at least one processor may fuse the sensor data from the forward camera and the plurality of sensor ICs to track one or more features present in an environment. In at least some implementations, the image sensor data may be fused with sensor data from other sensors, such as sensor data from an inertial measurement unit (IMU) of the HMD. The various features of the implementations of the present disclosure are discussed in detail below with reference to the Figures.

FIG. 1 is a simplified top plan view of an HMD system 100 that includes a pair of near-to-eye display systems 102 and 104. The near-to-eye display systems 102 and 104 include displays 106 and 108, respectively (e.g., OLED micro-displays), and respective optical lens systems 110 and 112 that each have one or more optical lenses. The display systems 102 and 104 may be mounted to a support structure or frame 114 or other mounting structure which includes a front portion 116, a left temple 118 and right temple 120. The two display systems 102 and 104 may be secured to the frame 114 in an eye glasses arrangement which can be worn on the head 122 of a wearer user 124. The left temple 118 and right temple 120 may rest over the user's ears 126 and 128, respectively, while a nose assembly (not shown) may rest over the user's nose 130. The frame 114 may be shaped and sized to position each of the two optical systems 110 and 112 in front of one of the user's eyes 132 and 134, respectively. Although the frame 114 is shown in a simplified manner similar to eyeglasses for explanatory purposes, it should be appreciated that in practice more sophisticated structures (e.g., goggles, integrated headband, helmet, straps, etc.) may be used to support and position the displays systems 102 and 104 on the head 122 of user 124.

The HMD system 100 of FIG. 1 is capable of presenting a virtual reality display to the user 124, such as via corresponding video presented at a display rate such as 30 frames (or images) per second or 90 frames per second, while other embodiments of a similar system may present an augmented reality display to the user 124. Each of the displays 106 and 108 may generate light which is transmitted through and focused by the respective optical systems 110 and 112 onto the eyes 132 and 134, respectively, of the user 124. While not illustrated here, each of the eyes includes a pupil aperture through which light passes into the eye, with a typical pupil size ranging from 2 mm (millimeters) in diameter in very bright conditions to as much as 8 mm in dark conditions, while the larger iris in which the pupil is contained may have a size of approximately 12 mm—the pupil (and enclosing iris) may typically move within the visible portion of the eye under open eyelids by several millimeters in the horizontal and/or vertical directions, which will also move the pupil to different depths from the optical lens or other physical elements of the display for different horizontal and vertical positions as the eyeball swivels around its center (resulting in a three dimensional volume in which the pupil can move). The light entering the user's pupils is seen by the user 124 as images and/or video. In some implementations, the distance between each of the optical systems 110 and 112 and the user's eyes 132 and 134 may be relatively short (e.g., less than 30 mm, less than 20 mm), which advantageously causes the HMD system 100 to appear lighter to the user since the weight of the optical systems and the display systems are relatively close to the user's face, and also may provide the user with a greater field of view.

The HMD system 100 may also include an outward facing or forward camera 136. The forward camera 136 may be operative to capture image data that may be selectively presented to the user 124, for example, in augmented reality applications or in conjunction with virtual reality applications. Additionally or alternatively, the forward camera 136 may be used by a position tracking system of the HMD system 100 to track the position of the HMD system 100 during use, as discussed further below. As an example, the forward camera 136 may comprise a video camera and associated lens system that captures images at a frame rate (e.g., 30 Hz, 60 Hz, 90 Hz) in a front camera field of view that has a relatively wide angle (e.g., 60°, 90°, 120°, 150°.

The HMD system 100 may also include a plurality (six shown) of optical flow sensor ICs 138a-138f (collectively, "optical ICs 138). Each of the sensor ICs 138 may be similar or identical to sensor ICs used in optical mice, for example. Generally, optical flow is the pattern of apparent motion of objects, surfaces, and edges in a visual scene caused by the relative motion between an observer (e.g., sensor IC) and the scene. The sensor ICs 138 may utilize optical flow data to provide tracking for the HMD system 100.

In at least some implementations, each of the sensor ICs 138 may be a vision sensor capable of measuring optical flow or visual motion and capable of outputting a measurement based on optical flow. The sensor ICs 138 may have various configurations. One example configuration is an image sensor chip connected to a processor programmed to run an optical flow algorithm. Another example configuration may use a vision chip, which may be an integrated circuit having both an image sensor and processing circuitry on the same die, allowing for a compact implementation. In at least some implementations, the processing circuitry may be implemented using analog or mixed-signal circuits to enable fast optical flow computation using minimal current consumption. Each of the sensor ICs may include a photoelectronic sensor array of optoelectronic material (e.g., complementary metal-oxide semiconductor (CMOS)) to form an array of pixels, such as 16×16 pixels, 32×32 pixels, etc. Further, each of the sensor ICs 138 may include associated lens systems to achieve desired optical features (e.g., FOV). As discussed above, each of the sensor ICs 138 may have a relatively high frame rate (e.g., greater than 1000 Hz) compared to the frame rate (e.g., 30 Hz, 90 Hz) of the forward camera 136.

While not illustrated in FIG. 1, some embodiments of such an HMD system may include various additional internal and/or external sensors, such as to perform pupil tracking separately for each eye 132 and 134, to track head location and orientation (e.g., as part of head tracking), to track various other types of movements and position of the user's body, other cameras to record external images (e.g., of an environment), etc.

Further, while the described techniques may be used in some embodiments with a display system similar to that illustrated in FIG. 1, in other embodiments other types of display systems may be used, including with a single optical lens and display device, or with multiple such optical lenses and display devices. Non-exclusive examples of other such devices include cameras, telescopes, microscopes, binoculars, spotting scopes, surveying scopes, etc. In addition, the described techniques may be used with a wide variety of display panels or other display devices that emit light to form images, which one or more users view through one or more optical lens. In other embodiments, the user may view one or more images through one or more optical lens that are produced in manners other than via a display panel, such as on a surface that reflects light from another light source in part or in whole.

Figure 2:
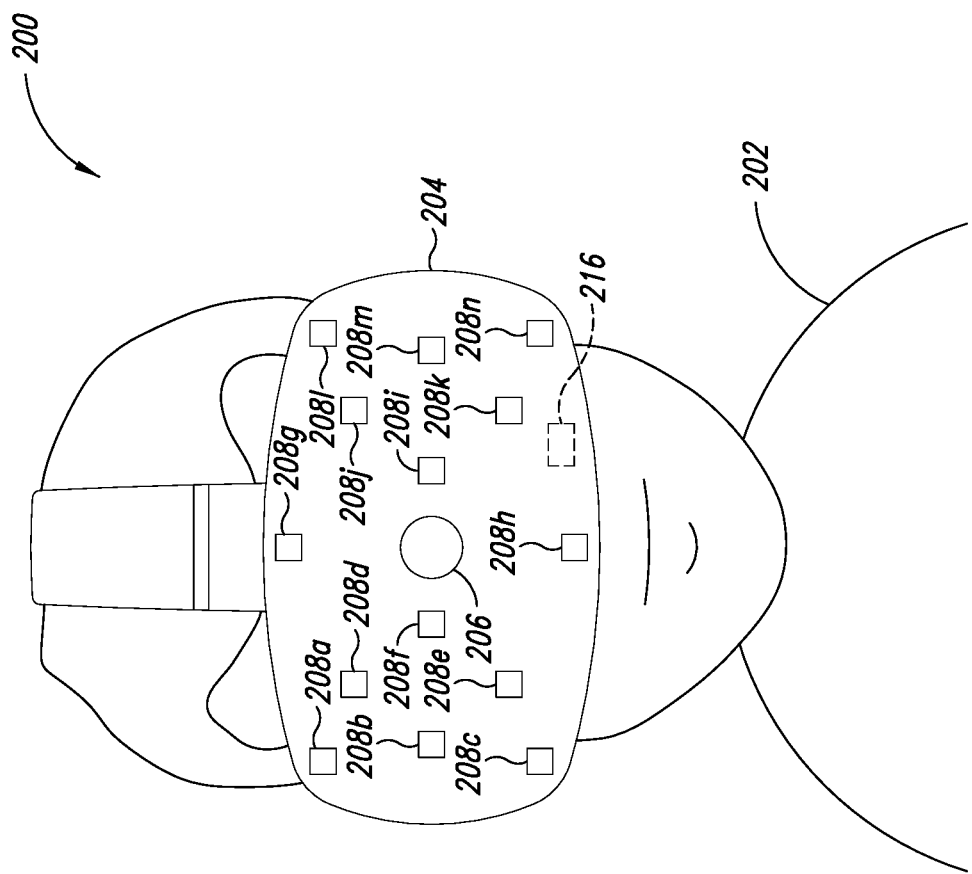
FIG. 2 is a front pictorial diagram of a head-mounted display system which includes binocular display subsystems, a forward camera, and a plurality of sensor integrated circuits, according to an example embodiment of the present disclosure.
Figure 3:
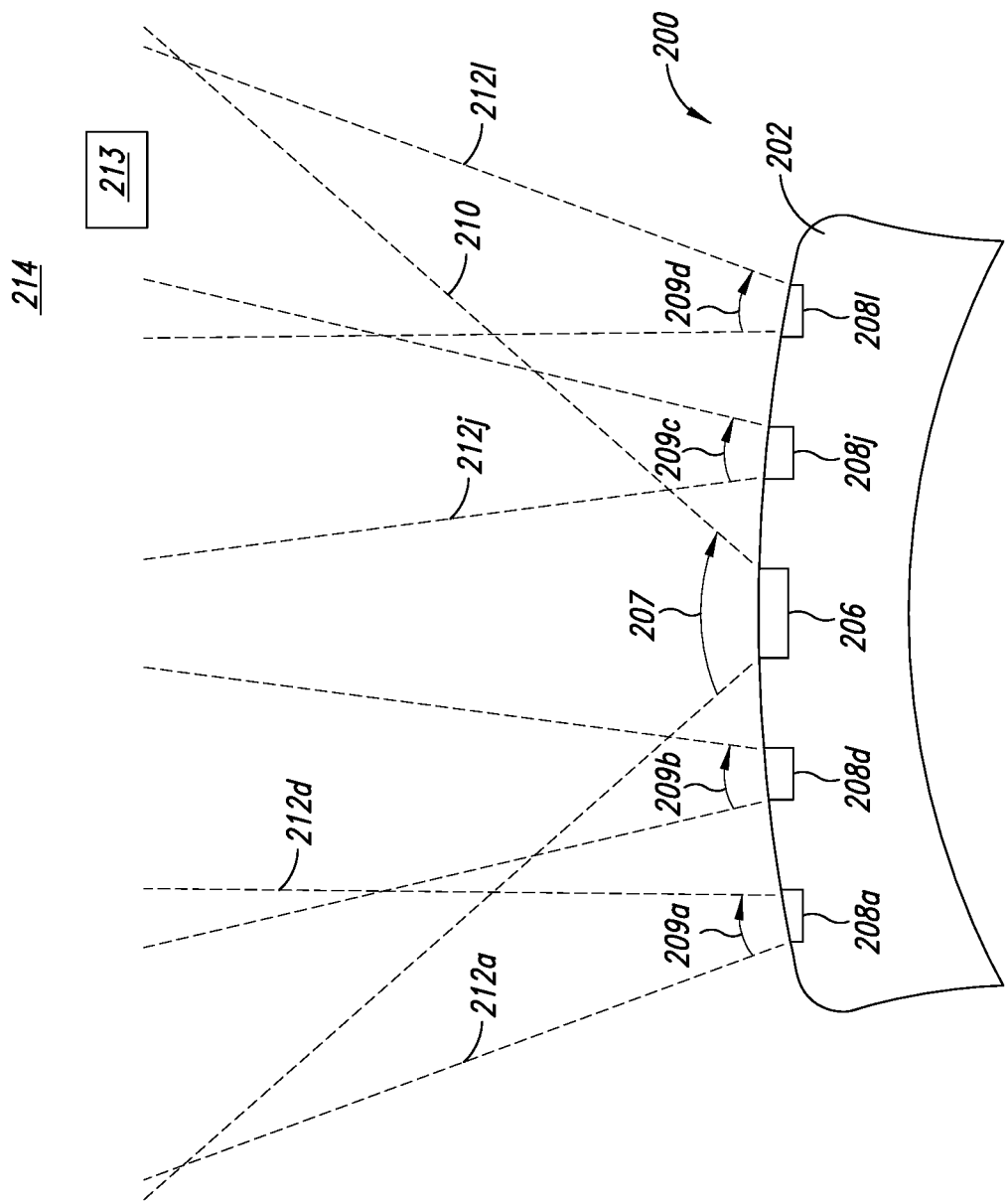
FIG. 3 is a top plan view of the head-mounted display system shown in FIG. 2, according to an example embodiment of the present disclosure.

FIG. 2 shows a front view of an example HMD system 200 when worn on the head of a user 202. FIG. 3 shows a top plan view of the HMD system 200, showing example fields of view 210 and 212 for some of the components of the HMD system 200. The HMD system 200 includes a support structure 204 that supports a front facing or forward camera 206 and a plurality of sensor ICs 208a-208n (collectively, 208). The forward camera 206 and the sensor ICs 208 may be similar or identical to the forward camera 136 and the sensor ICs 138, respectively, discussed above with reference to FIG. 1. The particular number of sensor ICs 208 may be fewer or more than the number of sensor ICs depicted in the Figures.

As shown, the forward camera 206 and the sensor ICs 208 are directed forward toward a scene or environment 214 (FIG. 3) in which the user 202 operates the HMD system 200. The environment 214 may include one or more objects 213 (one shown) therein, which may include walls, ceilings, furniture, stairs, cars, trees, tracking markers, or any other types of objects.

For explanatory purposes, only the sensor ICs 208a, 208d, 208j and 208l are shown in FIG. 3. As shown, the forward camera 206 includes a forward camera FOV 210 that has an FOV angle 207 (e.g., 60°, 90°, 120°, 150°. As shown, each of the sensor ICs 208a, 208d, 208j and 208l has a respective sensor IC FOV 212a, 212d, 212j and 212l (collectively, 212) that has a respective FOV angle 209a, 209d, 209j and 209l (collectively, 209). In at least some implementations, the FOV angles 209 of the sensor ICs 208 are narrower than the FOV angles 207 of the forward camera 206. For example, in at least some implementations, the FOVs 212 of the sensor ICs 208 may collectively cover at least a substantial portion of the FOV 210 of the forward camera 206, with each of the FOVs 212 covering a different portion of the FOV 210.

The HMD system 200 may also include an inertial measurement unit (IMU) 216 carried by the support structure 204. The IMU 216 may be an electronic device that measures and reports the HMD system's 200 specific force, angular rate, and/or the magnetic field surrounding the HMD system, using a combination of accelerometers and gyroscopes, and optionally, magnetometers. Relative to the forward camera 206, the IMU 216 may have a relatively high update or report rate (e.g., 500 per second, 1000 per second).

In operation, the HMD system 200 may fuse or otherwise combine data from the forward camera 206, the sensor ICs 208 and optionally the IMU 216 to track the position of the HMD system 200 during operation by the user 202. As an example, the forward camera 200 may have a first frame rate (e.g., 60 Hz) that is substantially lower than a second frame rate (e.g., 1000 Hz, 2000 Hz) of the sensor ICs 208. The HMD system 200 may register the respective FOVs 212 of the optical ICs 208 with the wider FOV 210 of the forward camera 206 to provide high bandwidth feature tracking across all or substantially all of the FOV 210 of the forward camera 206. Optionally, the HMD system 200 may also fuse sensor data from the IMU 216 to further improve the position tracking of the HMD system. As noted above, like the sensor ICs, the IMU 216 may also have a relatively high bandwidth or update rate. Thus, using the sensor ICs or the IMU 216, position data may be generated in-between frames of image sensor data from the forward camera 206, which provides greater precision position tracking.

In at least some implementations, the forward camera 206, sensor ICs 208, and/or IMU 216 may be used in conjunction with one or more base stations or other technologies (e.g., markers) to track the position of the HMD system 200. As an example, such components may be used in conjunction with the Lighthouse® base station developed by Valve Corporation. More generally, the features discussed herein may be used with or combined with any of the systems and methods discussed in U.S. Pat. Pub No. 2014/0267667; U.S. Pat. Pub No. 2016/0124502; U.S. Pat. Pub No. 2016/0131761; U.S. Pat. Pub No. 2016/0124502; or U.S. Pat. Pub No. 2017/0249019, the contents of which are incorporated by reference herein in their entirety.

The forward camera 206, sensor ICs 208, and/or IMU 216 may be used to determine how the position of the HMD system 200 changes in relation to the environment 216. When the HMD system 200 moves, the sensors 206, 208 and 216 readjust the position of the HMD system 200 in the environment 214 and the virtual environment may respond in real-time. The camera 206 and sensor ICs 208 observe features of the surrounding environment 214. When markers (e.g., primitive shapes, codes, active based stations) are used, such markers may be designed to be easily detected by the tracking system and placed in specific areas. With markerless tracking, distinctive characteristics or features that normally exist in the environment 214 may be tracked to determine the position, orientation and movement of the HMD system 200 in real-time. For example, the HMD system 200 may utilize one or more algorithms that identify specific images, shapes, or features, and may use them to calculate the HMD system's position, orientation, and/or movement in space. As noted above, data from the IMU 214 or other sensor may also be used to increase the precision of positional tracking of the HMD system 200.

Figure 4:
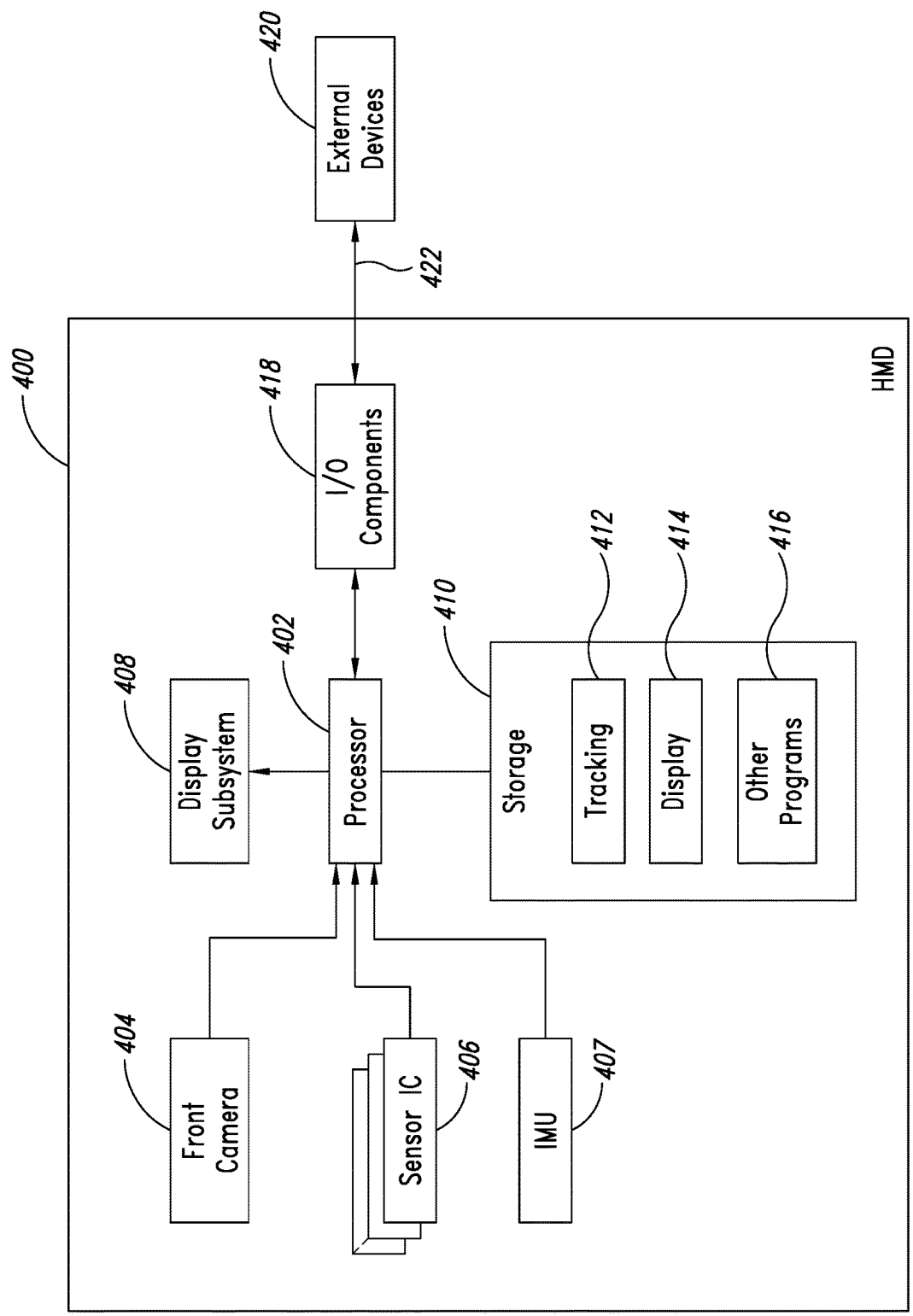
FIG. 4 is a schematic block diagram of a head-mounted display system, according to an example embodiment of the present disclosure.

FIG. 4 shows a schematic block diagram of an HMD system 400 according to one or more implementations of the present disclosure. The HMD system 400 may be similar or identical to the HMD systems 100 and 200 discussed above. Thus, the discussion above with regard to the HMD systems 100 and 200 may also apply to the HMD system 400.

The HMD system 400 includes a processor 402, a front-facing or forward camera 404, a plurality of sensor ICs 406, and optionally includes an IMU 407. The HMD system 400 may include a display subsystem 408 (e.g., two displays and corresponding optical systems). The HMD system 400 may also include a nontransitory data storage 410 that may store instructions or data for position tracking 412, instructions or data for display functionality 414 (e.g., games), and/or other programs 416.

The HMD system 400 may also include various I/O components 418, which may include one or more user interfaces (e.g., buttons, touch pads, speakers), one or more wired or wireless communications interfaces, etc. As an example, the I/O components 418 may include a communications interface that allows the HMD system 400 to communicate with an external device 420 over a wired or wireless communications link 422. As non-limiting examples, the external device 420 may include a host computer, a server, a mobile device (e.g., smartphone, wearable computer), etc. The various components of the HMD system 400 may be housed in a single housing (e.g., support structure 202 of FIGS. 2 and 3), may be housed in a separate housing (e.g., host computer), or any combinations thereof.

It will be appreciated that the illustrated computing systems and devices are merely illustrative and are not intended to limit the scope of the present disclosure. For example, HMD 400 and/or external devices 420 may be connected to other devices that are not illustrated, including through one or more networks such as the Internet or via the Web. More generally, such a computing system or device may comprise any combination of hardware that can interact and perform the described types of functionality, such as when programmed or otherwise configured with appropriate software, including without limitation desktop computers, laptop computers, slate computers, tablet computers or other computers, smart phone computing devices and other cell phones, Internet appliances, PDAs and other electronic organizers, database servers, network storage devices and other network devices, wireless phones, pagers, television-based systems (e.g., using set-top boxes and/or personal/digital video recorders and/or game consoles and/or media servers), and various other consumer products that include appropriate inter-communication capabilities. For example, the illustrated systems 400 and 420 may include executable software instructions and/or data structures in at least some embodiments, which when loaded on and/or executed by particular computing systems or devices, may be used to program or otherwise configure those systems or devices, such as to configure processors of those systems or devices. Alternatively, in other embodiments, some or all of the software systems may execute in memory on another device and communicate with the illustrated computing system/device via inter-computer communication. In addition, while various items are illustrated as being stored in memory or on storage at various times (e.g., while being used), these items or portions of them can be transferred between memory and storage and/or between storage devices (e.g., at different locations) for purposes of memory management and/or data integrity.

Thus, in at least some embodiments, the illustrated systems are software-based systems including software instructions that, when executed by the processor(s) and/or other processor means, program the processor(s) to automatically perform the described operations for that system. Furthermore, in some embodiments, some or all of the systems may be implemented or provided in other manners, such as at least partially in firmware and/or hardware means, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the systems or data structures may also be stored (e.g., as software instructions contents or structured data contents) on a non-transitory computer-readable storage medium, such as a hard disk or flash drive or other non-volatile storage device, volatile or non-volatile memory (e.g., RAM), a network storage device, or a portable media article (e.g., a DVD disk, a CD disk, an optical disk, a flash memory device, etc.) to be read by an appropriate drive or via an appropriate connection. The systems, modules and data structures may also in some embodiments be transmitted as generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present disclosure may be practiced with other computer system configurations.

Figure 5:
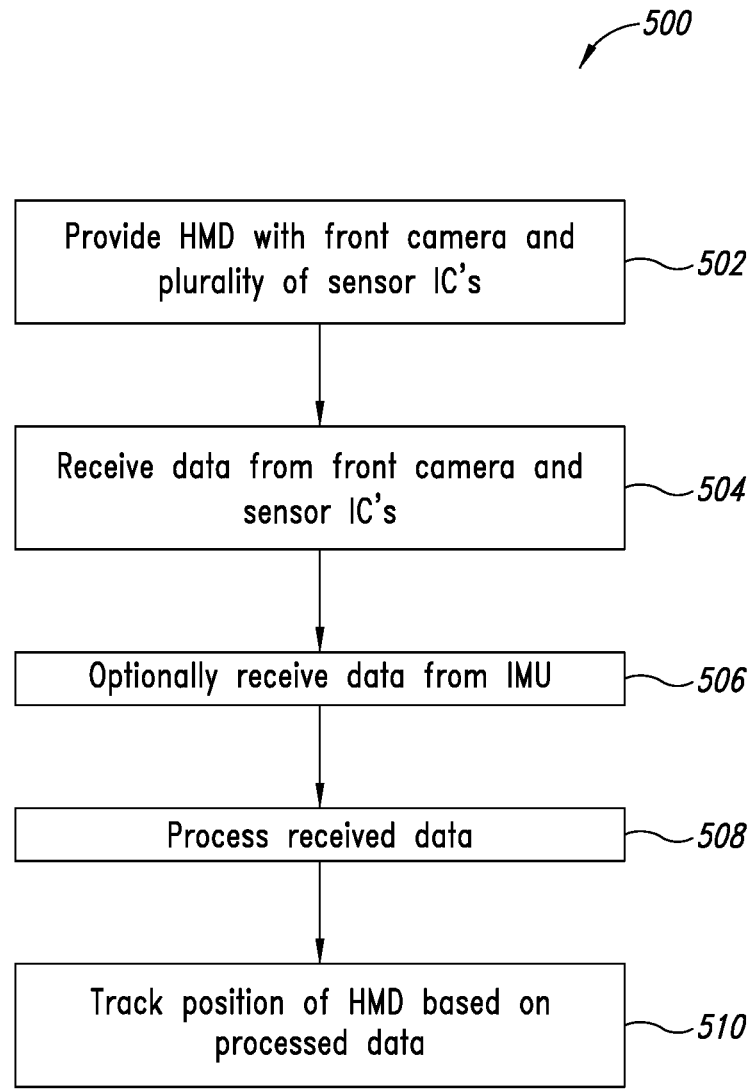
FIG. 5 is a flow diagram for a method of operating a position tracking system of a head-mounted display system to track the position, orientation and/or movement of the head-mounted display system during use, according to an example embodiment of the present disclosure.

FIG. 5 is a flow diagram for an example method 500 of operating an HMD system to track the position thereof during use. The method 500 may be performed by, for example, the position tracking system or module 412 of the HMD system 400 shown in FIG. 4.

The illustrated implementation of the method 500 begins at act 502, whereat an HMD system having a front-facing camera and a plurality of sensor ICs is provided. The front camera may capture image sensor data in a front camera field of view at a first frame rate. The plurality of sensor ICs may be operative to detect optical flow, for example. In operation, each of the plurality of sensor ICs captures image sensor data in a respective plurality of sensor IC fields of view at a second frame rate. In at least some implementations, the sensor IC fields of view are narrower than the front camera field of view, and the second frame rate of the sensor ICs is greater than the first frame rate of the front camera. For example, in at least some implementations, the first frame rate is less than or equal to 100 frames per second, and the second frame rate is greater than or equal to 1000 frames per second. In at least some implementations, each of the sensor IC fields of view overlap with a portion of the front camera field of view, such that the plurality of sensor IC fields of view collectively cover at least a substantial portion (e.g., 50%, 80%, 90%, 100%) of the front camera field of view. In at least some implementations, each of the sensor ICs may comprise a single die having image sensing circuitry and image processing circuitry thereon.

At 504, at least one processor associated with the HMD system may receive sensor data from the front camera and the plurality of sensor ICs. As an example the at least one processor may receive sensor data from the front camera at a first, lower rate, and may receive sensor data from the plurality of sensor ICs at a second, higher rate.

At 506, the at least one processor associated with the HMD system may optionally receive sensor data from an inertial measurement unit (IMU) that is operative to provide inertial tracking capabilities.

At 508, the at least one processor associated with the HMD system may process the received sensor data. For example, the at least one processor may fuse some or all of the sensor data together to track one or more features present in an environment in which the HMD system is operated. The sensor data may include sensor data from the front camera, sensor data from at least one of the plurality of sensor ICs, and optionally sensor data from an IMU.

At 510, the at least one processor associated with the HMD system may track the position, orientation, and/or movement of the HMD system in real-time during use of the HMD system by a user in the environment. The method 500 may continue during operation of the HMD to continuously track the position, orientation and/or movement of the HMD system, as discussed above.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various implementations described above can be combined to provide further implementations. To the extent that they are not inconsistent with the specific teachings and definitions herein, all of the U.S. patents, U.S. patent application publications, U.S. patent applications, foreign patents, foreign patent applications and non-patent publications referred to in this specification, including U.S. Provisional Application No. 62/618,928, filed Jan. 18, 2018 and U.S. Nonprovisional application Ser. No. 16/250,821, filed Jan. 17, 2019, are incorporated herein by reference, in their entirety. Aspects of the implementations can be modified, if necessary, to employ systems, circuits and concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A head-mounted display system, comprising:
a support structure wearable on the head of a user;
a camera carried by the support structure, in operation the camera captures image sensor data in a camera field of view at a first frame rate;
a plurality of optical flow sensor integrated circuits (ICs) that measure optical flow that are carried by the support structure, in operation each of the plurality of optical flow sensor ICs captures image sensor data in a respective plurality of sensor IC fields of view at a second frame rate, wherein each of the plurality of sensor IC fields of view is narrower than the camera field of view; and
control circuitry that, in operation:
receives the image sensor data from the camera and the plurality of optical flow sensor ICs;
processes the received image sensor data; and
tracks a position of the head-mounted display system based at least in part on the processing of the received image sensor data.

2. The head-mounted display system of claim 1, wherein at least a portion of the control circuitry is housed in the support structure or a separate housing.

3. The head-mounted display system of claim 1, wherein at least a portion of the control circuitry is housed in a host computer external to the support structure.

4. The head-mounted display system of claim 1, wherein the second frame rate is greater than the first frame rate.

5. The head-mounted display system of claim 1, wherein the control circuitry fuses the image sensor data from the camera and the plurality of optical flow sensor ICs to track the position of the head-mounted display system.

6. The head-mounted display system of claim 1, further comprising:
an inertial measurement unit (IMU) sensor operatively coupled to the control circuitry, wherein, in operation the control circuitry:
receives IMU sensor data from the IMU sensor;
processes the IMU sensor data and the image sensor data received from the camera and the plurality of optical flow sensor ICs; and
tracks the position of the head-mounted display system based at least in part on the processing of the received IMU sensor data and the received image sensor data.

7. The head-mounted display system of claim 1, wherein each of the plurality of optical flow sensor ICs comprises a single die having image sensing circuitry and image processing circuitry thereon.

8. The head-mounted display system of claim 1, wherein one or more of the sensor IC fields of view overlap with a portion of the camera field of view.

9. The head-mounted display system of claim 1, wherein the control circuitry registers the sensor IC fields of view with the camera field of view.

10. A method of operating a head-mounted display system, the head-mounted display system comprising a support structure wearable on the head of a user, a camera carried by the support structure and a plurality of optical flow sensor integrated circuits (ICs) that measure optical flow that are carried by the support structure, the method comprising:
capturing, via the camera, image sensor data in a camera field of view at a first frame rate;
capturing, via the plurality of optical flow sensor ICs, image sensor data in a respective plurality of sensor IC fields of view at a second frame rate, wherein each of the plurality of sensor IC fields of view is narrower than the camera field of view;

receiving, by control circuitry, the image sensor data from the camera and the plurality of optical flow sensor ICs;

processing, by the control circuitry, the received image sensor data; and tracking, by the control circuitry, a position of the head-mounted display system based at least in part on the processing of the received image sensor data.

11. The method of claim 10, wherein the second frame rate is greater than the first frame rate.

12. The method of claim 10, wherein processing the received image sensor data comprises fusing the image sensor data from the camera and the plurality of optical flow sensor ICs to track the position of the head-mounted display system.

13. The method of claim 10, wherein the head-mounted display system comprises an inertial measurement unit (IMU) sensor operatively coupled to the control circuitry, and the method further comprises:

receiving, by the control circuitry, IMU sensor data from the IMU sensor;

processing, by the control circuitry, the IMU sensor data and the image sensor data received from the camera and the plurality of optical flow sensor ICs; and tracking, by the control circuitry, the position of the head-mounted display system based at least in part on the processing of the received IMU sensor data and the received image sensor data.

14. The method of claim 10, wherein capturing image sensor data via the plurality of optical flow sensor ICs comprises capturing image sensor data via a plurality of optical flow sensor ICs that each comprise a single die having image sensing circuitry and image processing circuitry thereon.

15. The method of claim 10, wherein processing the received image sensor data comprises processing the received image sensor data to detect one or more features present in an environment in which the head-mounted display system operates.

16. The method of claim 10, wherein at least one of the sensor IC fields of view overlap with a portion of the camera field of view.

17. The method of claim 10, wherein processing the received image sensor data comprises registering the sensor IC fields of view with the camera field of view.

18. The method of claim 10, wherein the head-mounted display system further comprises first and second display subsystems which each provide a display for one eye of a user, the method further comprising:

selectively presenting images obtained from the camera via the first and second display sub systems.

\* \* \* \* \*